United States Patent
Trabzuni et al.

(10) Patent No.: US 8,287,833 B2
(45) Date of Patent: *Oct. 16, 2012

(54) SODIUM SILICATE SOLUTIONS

(75) Inventors: Fadi Mohammed Saeed Trabzuni, Jeddah (SA); Hassan Moenes El Dekki, Jeddah (SA); Chathangat Cheroolil Gopalkrishnan, Jeddah (SA)

(73) Assignee: The National Titanium Dioxide Co. Ltd. (CRISTAL), Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 13/238,271

(22) Filed: Sep. 21, 2011

(65) Prior Publication Data

US 2012/0007023 A1  Jan. 12, 2012

Related U.S. Application Data

(62) Division of application No. 12/589,736, filed on Oct. 28, 2009, now Pat. No. 8,057,770, which is a division of application No. 11/880,334, filed on Jul. 20, 2007, now Pat. No. 7,622,097.

(51) Int. Cl.
*C01B 33/32* (2006.01)

(52) U.S. Cl. ........ 423/334; 423/332; 423/324; 423/325; 423/326

(58) Field of Classification Search .................. 423/334, 423/332, 324, 325, 326
See application file for complete search history.

(56) References Cited

U.S. PATENT DOCUMENTS

| | | | |
|---|---|---|---|
| 3,203,755 A * | 8/1965 | Rathmell | 423/334 |
| 4,190,632 A | 2/1980 | Achenbach et al. | |
| 5,000,933 A | 3/1991 | Novotny et al. | |
| 5,215,732 A | 6/1993 | Hachgenei et al. | |
| 5,958,127 A | 9/1999 | Bomal et al. | |
| 7,255,815 B2 | 8/2007 | Krause et al. | |
| 7,622,097 B2 | 11/2009 | Trabzuni et al. | |
| 2004/0258601 A1 | 12/2004 | Matsubara et al. | |

FOREIGN PATENT DOCUMENTS

JP  2004-269311 A  9/2004

* cited by examiner

*Primary Examiner* — Jennifer Michener
*Assistant Examiner* — Heng Chan
(74) *Attorney, Agent, or Firm* — Kilyk & Bowersox, P.L.L.C.

(57) ABSTRACT

A method is provided for treating silica sand scrubs (SSS) generated and accumulated as waste in the chloride manufacturing process of titanium dioxide pigment. A hydrothermal process is used to produce sodium silicate solutions of modulus 3.0 to 3.8, and precipitated silicas. In some embodiments, the process uses two specific principal reaction stages. A sodium silicate solution having a low $SiO_2:Na_2O$ molar ratio, in the range from 2.0 to 2.8, is first produced by reaction of the SSS, as a cost-effective $SiO_2$ source, with aqueous caustic soda. The conversion of this intermediate sodium silicate solution of low modulus to a high $SiO_2:Na_2O$ molar ratio is made possible by using a $SiO_2$ source that is prepared as precipitated amorphous silica from the intermediate sodium silicate solution produced above.

8 Claims, 4 Drawing Sheets

2-Step Reaction Process for Sodium Silicate Solution

Modulus = molar ratio of $SiO_2$ to $Na_2O$ = (wt ratio of $SiO_2$ to $Na_2O$) x 1.032

2-Step Reaction Process for Sodium Silicate Solution

Modulus = molar ratio of $SiO_2$ to $Na_2O$ = (wt ratio of $SiO_2$ to $Na_2O$) x 1.032

Flow sheet of an embodiment of the inventive process

SODIUM SILICATE SOLUTIONS

CROSS-REFERENCE TO RELATED APPLICATIONS

This application is a continuation of U.S. patent application Ser. No. 12/589,736, filed Oct. 28, 2009, now U.S. Pat. No. 8,057,770 which is a divisional of U.S. patent application Ser. No. 11/880,334 filed Jul. 20, 2007 (now U.S. Pat. No. 7,622,097, issued Nov. 24, 2009), both of which are incorporated herein in their entireties by reference.

FIELD

The present teachings relate to processes of producing sodium silicate solutions and precipitated silicas.

BACKGROUND

In the chloride process for making titanium dioxide, titanium tetrachloride is oxidized in the vapour phase to titanium dioxide. The titanium dioxide and other reaction products are then carried forward through externally cooled conduits capable of heat exchange, where they are cooled and coalesced. During the cooling process, the oxide can be accreted upon the walls of the reactor and on other surfaces in the reaction zone. Accretion of $TiO_2$ product usually results in a number of deleterious effects, such as loss of product quality due to excessive retention of the product in a high temperature environment, drop-off of wall accretion into the main product stream, localized overheating of equipment due to poor heat transfer through the accretion and plugging of gas entries.

These problems resulting from the formation of $TiO_2$ particulate deposits on the internal walls of conduits can be reduced by introducing relatively hard granular abrasion particles into the hot suspension. Silica sand is preferably used, as granular scrubs for removing $TiO_2$ deposits from the internal surfaces of cooling conduits containing a hot suspension of $TiO_2$ particles, for example, suspension containing from 0.1% to 0.5% by weight of titanium dioxide pigment. The specific particles for such scrubbing can have average diameters in the range of size distribution of from about 1 mm to about 0.5 mm.

For simplicity of description, the above-described scouring particles are herein under referred to as "scrubbing solids" or simply "scrubs."

The scrubs are introduced before the reaction stream exits the reactor into cooling ducts to scrub and remove build-up from the interior of the flue pipes downstream from the $TiO_2$ oxidation section. The reaction stream with the scrub solids is cooled.

The pigment and scrub solids are discharged from the cooler to a cyclone and then a bag filter to separate the gases. The solids are then slurried in water.

Since such scrub particles constitute undesired grits in the pigment product, it is necessary to remove them.

The slurry is screened for subsequent treatment and silica sand scrubs are separated from the titanium dioxide slurry as they can contaminate the final titanium dioxide pigment product.

As a matter of fact, the silica sand scrubs reclaimed from a titanium dioxide slurry resulting from a chloride manufacturing process presents environmental problems as there is no means for complete reprocessing and recycling of the scrub material. Previously, no significant technically and economically practical use of this waste has been provided so the waste has either been collected and used as landfill or moved to a dump. As the sand material becomes available in large quantities as a waste material at site, it becomes increasingly more environmentally invasive and its disposal becomes more and more difficult and expensive.

It is well recognized in this industry that any use to which these silica sand scrub wastes can be put would be highly beneficial. Therefore, there exists a need for a process for converting the silicon dioxide content of this waste into products such as silicates and silica gel, or precipitated silicas, which represent high grade value-added products exhibiting a wide range of useful applications.

There are a number of process techniques for the production of water soluble alkali silicates. These include, inter alia, either the dry process or the wet process. In the dry process, quartz sand is used as source of silicon dioxide and is caused to react with soda or sodium carbonate in melt temperatures in the range from 1400° C. to 1500° C. and subsequently dissolved in water under pressure at elevated temperature in another processing step.

In the wet process, quartz-sand is made to react in a pressure reactor at a temperature of 180° C. to 250° C., under saturated steam pressure corresponding to the temperature used, with an aqueous alkali-hydroxide solution.

Thus, the source of silica in either of these two above processes is quartz sand. In the case of wet process, the conversion reaction is sluggish and does not take place quantitatively and results in low modulus sodium silicate. If sodium silicate with a high $SiO_2:Na_2O$ molar ratio is to be produced, the essential prerequisite is the selective utilisation of higher soluble silica modifications like amorphous silicon dioxide, such as that from industrial flue dusts, from naturally occurring amorphous silicon dioxide containing materials and cristobalite modification of the silica sand, either available from nature or prepared by tempering process, as source of silica in the process. Alongside these, industrial by-and-waste products play as alternative raw materials for the production of cheap sodium silicate solutions.

As described above, the dry process has the disadvantages that the process is highly expensive both in terms of investment and maintenance costs and in terms of energy consumption and, further, it causes considerable air pollution. It is characterized, in addition, by a particularly careful selection of the silicon dioxide material, especially with a view toward the content of iron and aluminum oxides.

The following prior art processes involve conventional processing techniques using different sources of silicon dioxide for the production of sodium silicate solutions.

U.S. Pat. No. 4,190,632 teaches a process for producing sodium silicate solution by treating air-borne dust containing silicon dioxide with an alkali to form an alkali metal silicate solution at a temperature of about 60° C. to about 110° C., wherein the air-borne dust is a waste product that has been removed from the flue gases originating from silicon metal or ferro silicon alloy production processes with particle size below 90 micron, followed by purification by adding activated charcoal and/or oxidation agents such as sodium peroxide or hydrogen peroxide and filtration. The purifying agents are added 1 hour before the end of boiling. The flue dusts used as starting materials has high amorphous silica, $SiO_2$, content of 89.5% to 97.5% by weight, the remaining consisting of impurities. The sodium silicate solution obtained had a $SiO_2:Na_2O$ molar ratio of 4.1:1. The process is characterized in that very fine amorphous siliceous particles in the form of flue dust are used as source of silicon dioxide and that the product is subjected to purification steps involving activated charcoal and oxidizing agents.

U.S. Pat. No. 5,000,933 discloses a process for direct hydrothermal production of high purity sodium silicate solutions having a high $SiO_2:Na_2O$ molar ratio by reaction of a silicon dioxide source with aqueous sodium hydroxide solutions, or with aqueous sodium silicate solutions having a lower $SiO_2:Na_2O$ molar ratio, characterized in that the silicon dioxide source provided contains a sufficient fraction of natural cristobalite phase, or synthetic cristobalite produced by conditioning other crystalline forms of silicon dioxide by heating at a temperature from about 1200° C. to about 1700° C. in the presence of a catalyst but below the melting point of silica, before the hydrothermal treatment. Even with use of readily soluble natural or synthetic cristobalite containing silicon dioxide, the hydrothermal reaction has to be carried out in a closed pressure reactor at a temperature in the range of from 200° C. to 250° C., for example, 225° C., under saturated steam pressures corresponding to the temperature, in order to get a $SiO_2:Na_2O$ molar ratio of from 3.3 to 3.5:1.

It can be seen that the prior art processes described above follow methods for making sodium silicate solutions characterized in that the raw material comes as specialized product such as natural or synthetic cristobalites and in that very fine by-product and waste-product silicon dioxide sources are utilised. It is specific in that the cristobalite modification of the silica sand is used either exclusively in a single stage reaction process or by preparing a cristobalite modification from natural sand through a tempering process followed by a two-stage reaction process. This means a high process cost due to the high price of the raw material containing cristobalite. The tempering process option involves both a highest investment and a high process risk. A single stage reaction process using cristobalite might exhibit the lowest investment effort but exhibits the highest operational costs due to the need for cristobalite as a raw material.

There exists a need for a reprocessing inexpensive silica sand scrub wastes emanating from titanium dioxide production processes using chloride technology, as a low cost starting material. There is a need to convert this waste into high modulus sodium silicates and silicas, which represent value-added products exhibiting a wide range of applications, especially for captive use for silica coating of titanium dioxide pigment and as fillers and extenders in diverse industrial products.

SUMMARY

According to various embodiments, the present teachings provide a method for manufacturing cost-effective quality sodium silicate solutions of high modulus which involves replacing conventional silica sources with inexpensive and readily processable precursors of silica.

In accordance with the present teachings, it has been found that the very silica sand scrubs recovered from and collected which are high in silicon content can be disposed of by converting them into silicates and silicas as described herein.

In accordance with a feature of the present teachings, these recovered materials have desirable properties as a result of their prior thermal history of going through a thermal treatment during their initial use as scrubbers in the oxidizer which can ease autoclave reaction in a subsequent sodium silicate production.

The main impurity in the scrubs is $TiO_2$ originating from $TiO_2$ pigment adhering to the surface. In accordance with an embodiment of the present teachings, the surface purification involves the $TiO_2$ impurity and exfoliation and dispersion thereof from the surface of the scrubs that can be easily achieved by subjecting to shear washing.

It has been found that surprising quality improvement can be sufficiently achieved for subsequent processing when the washed and dried sand prepared as above is sieved on a 1 mm sieve. By this sieving step only approximately 2% of the total weight of the washed sand was removed. Therefore, the choice of sieving under the present teachings offers an additional simple method of purifying the scrubs of their $TiO_2$ impurities.

In some embodiments silica sand waste emanating from titanium dioxide production by the chloride route, is used for the hydrothermal production of water soluble sodium silicate solutions having a wide range of $SiO_2:Na_2O$ ratios, and preferably having an $Na_2O$ content high enough to provide a clear water solution for use.

The present teachings relate to a process for the hydrothermal production of sodium silicate solutions having a high $SiO_2:Na_2O$ molar ratio, wherein silica sand scrubs that have been recovered and collected as waste from a titanium dioxide manufacturing process using chloride technology are used as a precursor of silica. The present teachings, also relate to a method of using silica sand scrubs that have been reclaimed by recovery systems from a titanium dioxide manufacturing process involving chloride technology, and previously considered waste, as a value-added product and using it in the hydrothermal production of high modulus sodium silicate solutions, and in a myriad of other applications. The present teachings also relate to a method of management and disposal of such waste to bring it in line with strategic waste management systems thereby assuring environmental protection. In addition, the present teachings relate to a method of producing precipitated silicas from aqueous-based sodium silicate solutions resulting from processing silica sand scrubs reclaimed from a titanium dioxide manufacturing process.

The present teachings overcome the aforementioned shortcomings of the prior art, and fulfills needs in the art by providing a process for the hydrothermal production of sodium silicate solutions (SS), and such compositions themselves, wherein silica sand scrubs that have been generated and collected as waste during a chloride process of manufacturing titanium dioxide pigment, are used as a cost-effective precursor of silicon dioxide. According to various embodiments, the process can comprise two specific principal stages of a reaction process, in which sodium silicate solutions of low modulus are initially produced, designated as intermediate (stage 1) sodium silicate solutions, that can be further processed to yield a sodium silicate solution of high molar ratio, designated as "boosted" sodium silicate (stage 2).

The products obtained from stage 1 and stage 2, can have the following typical characteristics, that are seen in Table-1 below:

TABLE 1

Typical Characteristics of Sodium Silicate of the present teachings

| Characteristics | Low Modulus Intermediate (Stage 1) | High Modulus Boosted (Stage 2) |
| --- | --- | --- |
| °Be | 47.35 | 40.55 |
| Density | 1.45-1.48 | 1.3882 |
| $SiO_2$, % | 30.27 | 29.17 |
| $Na_2O$, % | 12.18 | 8.55 |
| Dry product, % wt | 42.45 | 37.72 |
| $SiO_2$ % dry product | 71.31 | 77.33 |
| $Na_2O$ % dry product | 28.69 | 22.67 |
| $SiO_2:Na_2O$, R | 2.56 | 3.52 |

According to various embodiments of the present teachings, a process of preparing high modulus sodium silicate by a hydrothermal reaction of waste silica sand scrubs and caustic soda can comprise the chronological steps of:
1. attacking silica sand scrubs with caustic soda to obtain sodium silicate (SS) having a Modulus® of from 2.0 to 2.8, as an intermediate product;
2. producing precipitated silica by reacting the SS from step 1 with an acidifying agent;
3. raising R from the range of 2.0 to 2.8 to the range of 3.0 to 3.8 by reacting SS from step 1 with precipitated silica obtained from step 2; and
4. drying excess wet silica of step 2, to obtain a moisture content of from about 5% by weight to about 50% by weight.

According to various embodiments, the process can further comprise the steps of:
1. shear washing of waste silica sand scrubs plus filtration;
2. optionally mill of sand;
3. Filtration of residuals after hydrothermal fusion of sand and caustic soda (autoclave digestion);
4. filtration and washing of amorphous precipitated silica after precipitation of amorphous silica; and
5. final clarifying filtration after dissolution of amorphous precipitated silica in sodium silicate solution (boosting the modulus).

According to various embodiments, the present teachings provide a highly efficient and improved process for producing precipitated silicic acid products that exhibit lower wet cake moisture and/or higher percent solids, than products previously available, and which can be highly suitable for boosting the modulus of sodium silicate solutions. An additional property of the precipitated silica of the present teachings is the wet cake low moisture content. In some embodiments the moisture content can be at most 55% by weight, or equal to or less than 50% by weight.

According to various embodiments of the present teachings, silica sand scrubs generated as waste during a titanium dioxide pigment production using the chloride process, which are inexpensive and possess desirable properties, can be utilised as a cost-effective precursor of silicon dioxide for use in a hydrothermal production of sodium silicate solutions. In some embodiments, the silica sand scrubs can be characterized by the following physical and chemical properties, are summarized in Table 2 below:

TABLE 2

Typical Physical and Chemical Properties of SSS Before and After Purification

| Analyses | Before Wash Silica sand Scrubs | Chemical Analysis Silica sand Scrubs | After washing and sieving | | |
|---|---|---|---|---|---|
| | | | Sieve Analysis | | |
| | | | ASTM Mesh | % passed | % cumulative |
| Al, ppm | 1300 | 1000 | +25 | 37.12 | 37.12 |
| Ca, ppm | 1700 | 1700 | −25 +35 | 37.90 | 75.02 |
| Fe, ppm | 350 | 250 | −35 +80 | 24.30 | 99.32 |
| Cr, ppm | 10 | 3 | −80 +100 | 0.37 | 99.69 |
| Mn, ppm | 5 | 5 | −100 +140 | 0.24 | 99.93 |
| Ni, ppm | <2 | <2 | −140 +170 | 0.05 | 99.98 |
| Pb, ppm | <2 | <2 | −170 +200 | 0.01 | 99.99 |
| K, ppm | 400 | — | −200 | 0.01 | 100.00 |
| Mg, ppm | 400 | — | — | — | — |
| Ti, ppm | 58000 | 550 | — | — | — |

The silica sand scrubs can be further characterized by x-ray diffraction (XRD) and energy-dispersive x-ray spectroscopy (EDX) analyses, the results of which show that scrubs can be built up purely of quartz modification of silica only. In some embodiments, $TiO_2$ impurities can be present as crystals on the surface of the quartz particles and not evenly distributed as whole particles.

According to various embodiments of the present teachings, disposing silica sand scrubs that have been released and collected as waste in a titanium dioxide by the chloride manufacturing process, can be accomplished simultaneously by a process of converting silica sand scrubs into value-added products, such as, for example, sodium silicate solutions, silica gels, and/or precipitated silicas, as described herein. Sodium silicate solutions, also known as soda water glass, can be used for industrial purposes such as for the production of fillers (precipitated silicas), as adhesives, as binders in paints, as foundry aids, as catalyst supports, as a component of detergents, and as a constituent of refractory materials. Precipitated silicas can be used, for example, as white reinforcing fillers in the rubber and plastics industries, and as additives in paints, coatings, varnishes, lacquers, papers, cosmetics, pharmaceuticals, feed and pesticide industries.

It will be understood that some general objects of the present teachings are to provide novel resources of cost-effective silica precursors for the hydrothermal production of sodium silicate solutions having a high $SiO_2:Na_2O$ molar ratio, and processes for preparing the same. In addition, it is an object of the present teachings to provide processes for producing new silicate and silica compositions and also to provide such compositions themselves. Also, it is an object of the present teachings to provide advancements in waste utilization.

DEFINITIONS

As used herein, the term silica sand scrubs (SSS), is defined as silica sand solids which are used to scrub and remove build-up from the interior of flue pipes downstream from a $TiO_2$ oxidation section of a chloride process reactor.

The expression "modulus" of a sodium silicate solution is defined as the molar ratio of $SiO_2$ to $Na_2O$ and is obtained by the following expression:

$$\text{Modulus } R = (\% \ SiO_2 / \% \ Na_2O) \times (1.032)$$

The term "structure" of a precipitated silica is defined as the ability of a silica material to hold water in the wet cake after the precipitate has been filtered.

BRIEF DESCRIPTION OF THE DRAWINGS

The present teachings will be more fully understood with reference to the appended drawings, which are exemplary only and not intended to limit the scope of the present teachings. In the drawings.

DETAILED DESCRIPTION

Figure 1:
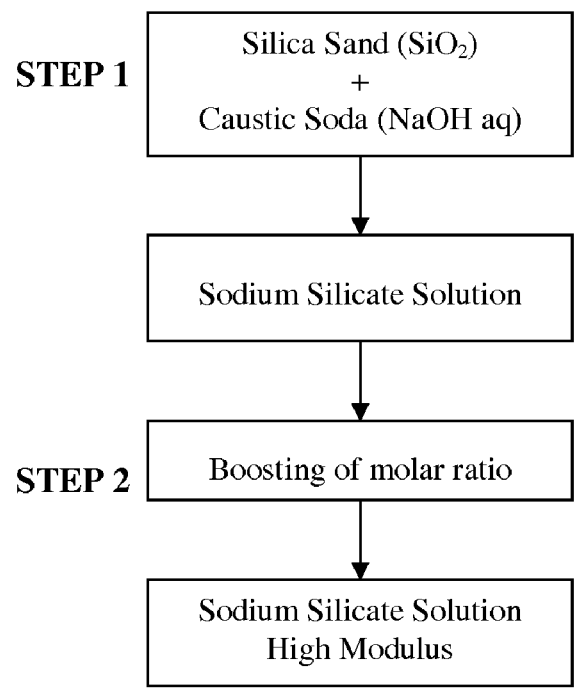
FIG. 1 is a flow diagram of a 2-step reaction process for producing sodium silicate solution, according to various embodiments of the present teachings.
Figure 2:
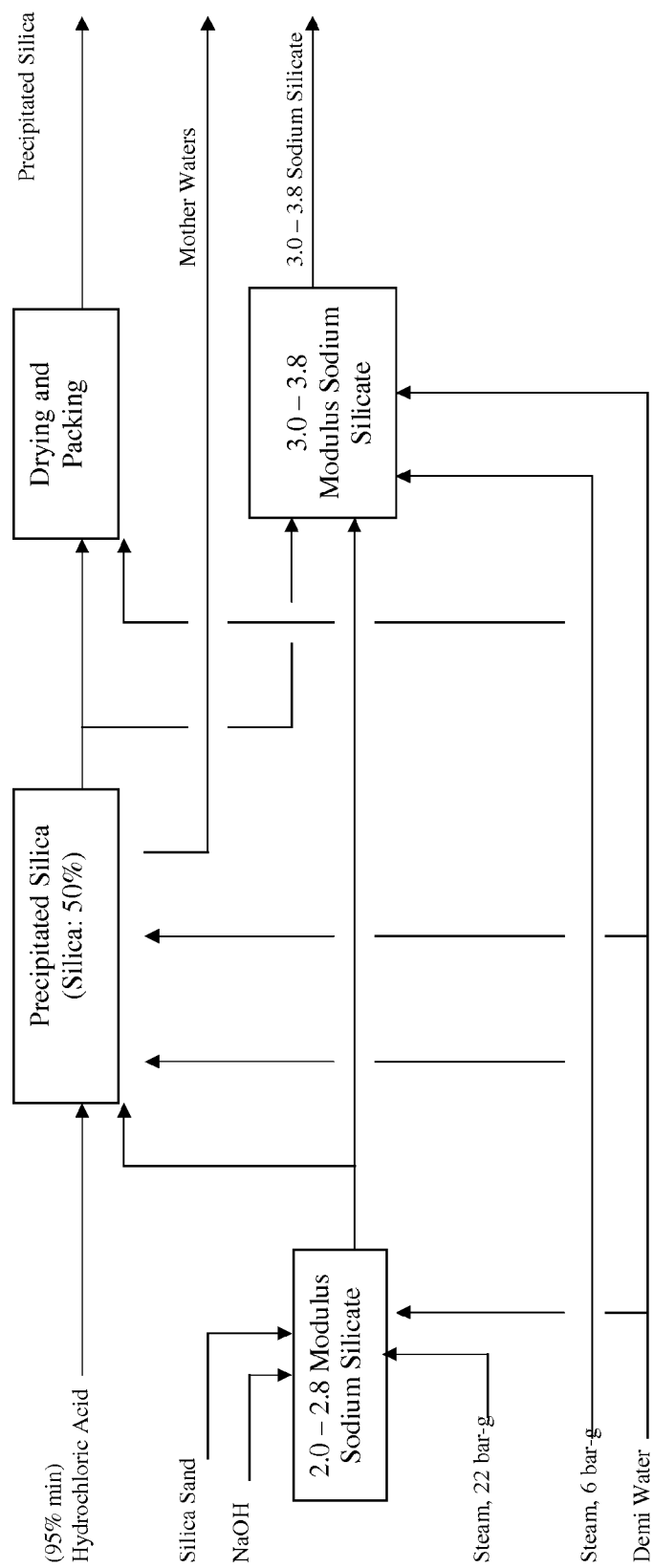
FIG. 2 is a flow diagram of a process for producing high modulus sodium silicate and precipitated silica, according to various embodiments of the present teachings.

The present teachings relate to a hydrothermal process for producing sodium silicate solutions from silica sand scrubs. In FIG. 1, a general process according to an embodiment of the present teachings is shown. FIG. 2 shows another embodiment of the process, according to the present teachings.

According to various embodiments, a method for hydrothermally producing sodium silicate solution and precipitated silica can utilize raw materials comprising silica sand scrubs generated and collected as waste in a titanium dioxide manufacturing process using the chloride process, and utilizing caustic soda (aqueous NaOH), and an acidifying agent. The caustic soda and the acidifying agent can be chosen in a manner that is well known to one of ordinary skill in the art. The caustic soda comprise, for example, conventional caustic soda produced by electrolysis of sodium chloride or hydrogen chloride, and having a concentration of about 50% by weight.

The acidifying agent can comprise, for example, hydrochloric acid (hydrogen chloride), such as conventional hydrochloric acid produced by electrolysis of sodium chloride, or a by-product from the chlorination unit of a $TiO_2$ pigment manufacturing reactor that uses the chloride manufacturing process. Using a hydrochloric acid by-product, having a concentration of from about 20% to 25% by weight, can provide benefits of lower cost, by-product utilization, and pollution abatement.

According to various embodiments, sodium silicate compositions can be produced and provided that exhibit a $SiO_2$:$Na_2O$ molar ratio in the range of from about 2.0 to about 2.8, in an intermediate stage, and a molar ratio in the range of from about 3.0 to about 3.8 in a modulated stage.

Preparation of Silica Sand Scrubs as Feedstock for Sodium Silicate

According to various embodiments of the present teachings, the above described silica sand scrubs can be used as a feedstock in the preparation of sodium silicate. The silica sand scrubs can contain appreciable $TiO_2$ on the surface of the particles. In some embodiments, the method can comprise preparing scrubs as a feedstock for an autoclave digestion.

In some embodiments, particulates of silica sand scrubs in a $TiO_2$ aqueous slurry can contain up to 9.7% surface-adsorbed $TiO_2$ upon subsequent recovery. This $TiO_2$ presence on the surface can affect the quality of the resulting sodium silicate solution, particularly with respect to clarity, which problems can be overcome by shear washing and sieving operations.

According to various embodiments, a process for preparing feed stock from silica sand scrubs can comprise four specific main stages: shear washing; filtration; drying; and sieving.

An objective of the shear washing step can be to exfoliate and remove $TiO_2$ pigment particles adhering to the surface of the silica sand scrubs particles so that the cleaned sand can be used for a subsequent reaction step to manufacture sodium silicate solution. It has been found that filtration and washing conditions have a strong influence on the overall washing results.

Silica sand can be treated to remove residual $TiO_2$ particles, and conventional methods can be used to apply shear to the sand particles. Shearing action can be applied by appropriate methods, for example, by mechanical means, by pressure alteration, or by ultrasonic treatment, all known to one of ordinary skill in the art. For example, the aqueous slurry can be sheared by mechanical methods in which the adhering $TiO_2$ can be sheared by use of mechanical means, such as by stirrers. In another example, shear can be achieved by ultrasonic techniques in which cavitations or resonant vibrations cause portions of the particles to vibrate or to be excited at different phases and thus subjected to shear. These methods of shearing are merely representative of useful methods, and any suitable method known to one of ordinary skill in the art can be used for shearing.

In some embodiments, exfoliation can be sufficiently high such that about 80% to about 99% by weight, or at least about 85% by weight, at least about 90% by weight, at least about 99% by weight of $TiO_2$ content can be delaminated from the surface to form a slurry comprising $TiO_2$ particles substantially dispersed in an aqueous carrier. The dispersed particles can be subsequently removed from the slurry by filtration.

As described above, in some embodiments the shear washing of the sand can be followed by filtration to remove exfoliated and dispersed $TiO_2$. The washings can be done at increased solids content, for example, with a ratio of water to sand amount in the range of from about 1:0.92 to about 1:0.85.

According to some embodiments, the pH of the slurry can be adjusted to achieve a level in the range of from about 6.0 to about 9.0. The mixture can be stirred under high shear conditions using, for example, a high speed stirrer. Under high shear conditions at high solids content, residual $TiO_2$ deposits on the surface can be broken up by high shear stress. Washing can also involve introducing baffles in the washing vessel. Under such washing conditions, substantially all $TiO_2$ residues can be removed by increasing the mixing speed of the mixer. In an exemplary process, the agitation time can be from about two to about five minutes with a stirrer speed in a range of from 600 rpm to 1000 rpm, or in the range of from about 600 rpm to about 800 rpm.

To improve the transfer conditions from the washing vessel to the filtration unit in order to achieve a constant flow of a homogeneous suspension, a vessel with a large bottom outlet nozzle can be used, for example, an outlet nozzle having a diameter than is at least 10% or at least 25% the diameter of the vessel.

According to various embodiments, results can be achieved based on the fact that the filtration area and the sand cake height can bear an important relationship with respect to the amount of $TiO_2$ content in the cake. In some embodiments, filtration performance can be achieved with a filtration area in the range of from 100 $cm^2$ to 1000 $cm^2$, and a corresponding filter cake thickness in the range of from 10 mm to 70 mm, which can result in a silica sand comprising a $TiO_2$ content in the range of from 1.0% to 1.5% by weight. In some embodiments, a filtration area in the range of from 200 $cm^2$ to 800 $cm^2$ can be used with a corresponding filter cake height in the range of from 20 mm to 50 mm, which can result in a silica sand comprising a $TiO_2$ content in the range of from about 0.13% to about 0.16% by weight. In some embodiments, filtration performance can be achieved, with a filtration area of 700 $cm^2$ and a corresponding filter cake height of 31 mm, which can result in a silica sand comprising a $TiO_2$ content in the range of from about 0.05% to about 0.10% by weight.

According to various embodiments, the specific sand mass on the filtration area can be in the range of from about 25 $kg/m^2$ to about 100 $kg/m^2$ filtration area, for example, in the range of from about 25 $kg/m^2$ to about 75 $kg/m^2$ filtration area, or about 50 $kg/m^2$ filtration area.

It has been found that when washed and dried sand is sieved on a 1 mm sieve, practically all contaminating impurities are removed. By practicing this sieving step only approximately 2% of the total weight of the washed sand was lost in the tailing.

The removed fraction, comprising particles that did not pass through a 1 mm sieve, exhibited the typical analysis shown below in Table 3.

TABLE 3

Typical Analysis of washed sand fraction >1 mm

| Ti | Al | Ca | Fe | Cr | Mn | Ni | Pb |
|---|---|---|---|---|---|---|---|
| 4.8% (TiO$_2$: 8%) | 0.68% | 0.35% | 0.51% | 40 ppm | 35 ppm | 45 ppm | 5 ppm |

Autoclave Reaction and Following Filtration of Residuals

According to various embodiments, the silica sand scrubs recovered and collected as wastes that are high in silicon content can be disposed of by converting them to silicates and silicas. More particularly, these recovered materials can have desirable properties as a result of their previous thermal shock history of going through a thermal treatment during their use as scrubbers in the titanium tetrachloride oxidizer of a chloride process reactor. This treatment can ease a subsequent autoclave reaction and the main impurity can be TiO$_2$ pigment that can be readily washed off the sand.

Figure 3:
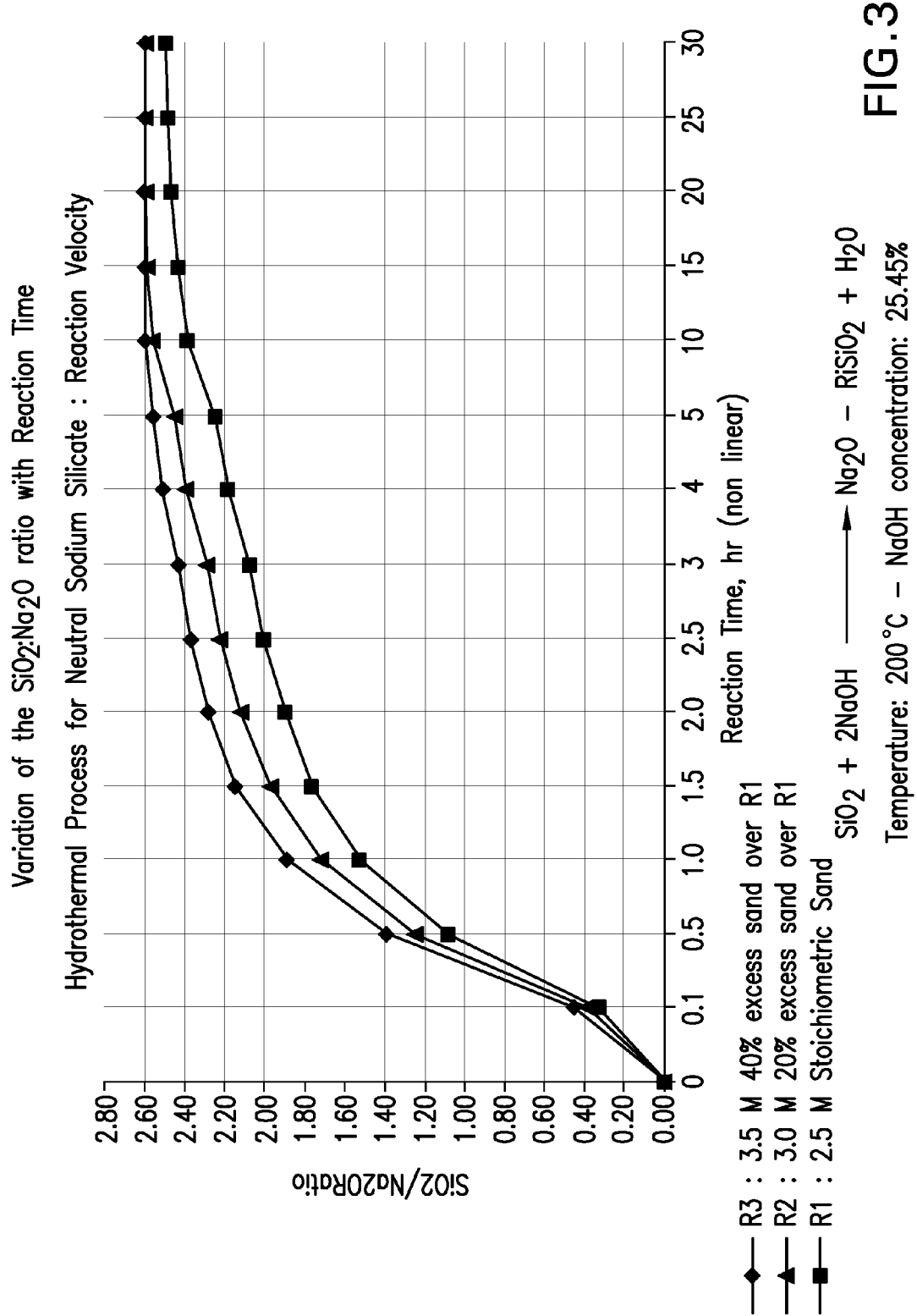
FIG. 3 is a graphical representation of the variation of the $SiO_2:Na_2O$ ratio, with time of reaction, in an autoclave, according to various embodiments.

According to various embodiments of the present teachings, a method for preparing sodium silicate solution can be accomplished by pretreating silica sand scrubs of the type described above by reacting them with caustic soda in a pressurized autoclave. From kinetic constant calculation, at 200° C., it has been found that the maximum ratio of SiO$_2$:Na$_2$O obtainable, using an infinite time of reaction, is 2.6. FIG. 3 shows the variation of the SiO$_2$:Na$_2$O ratio with time of reaction.

Figure 4:
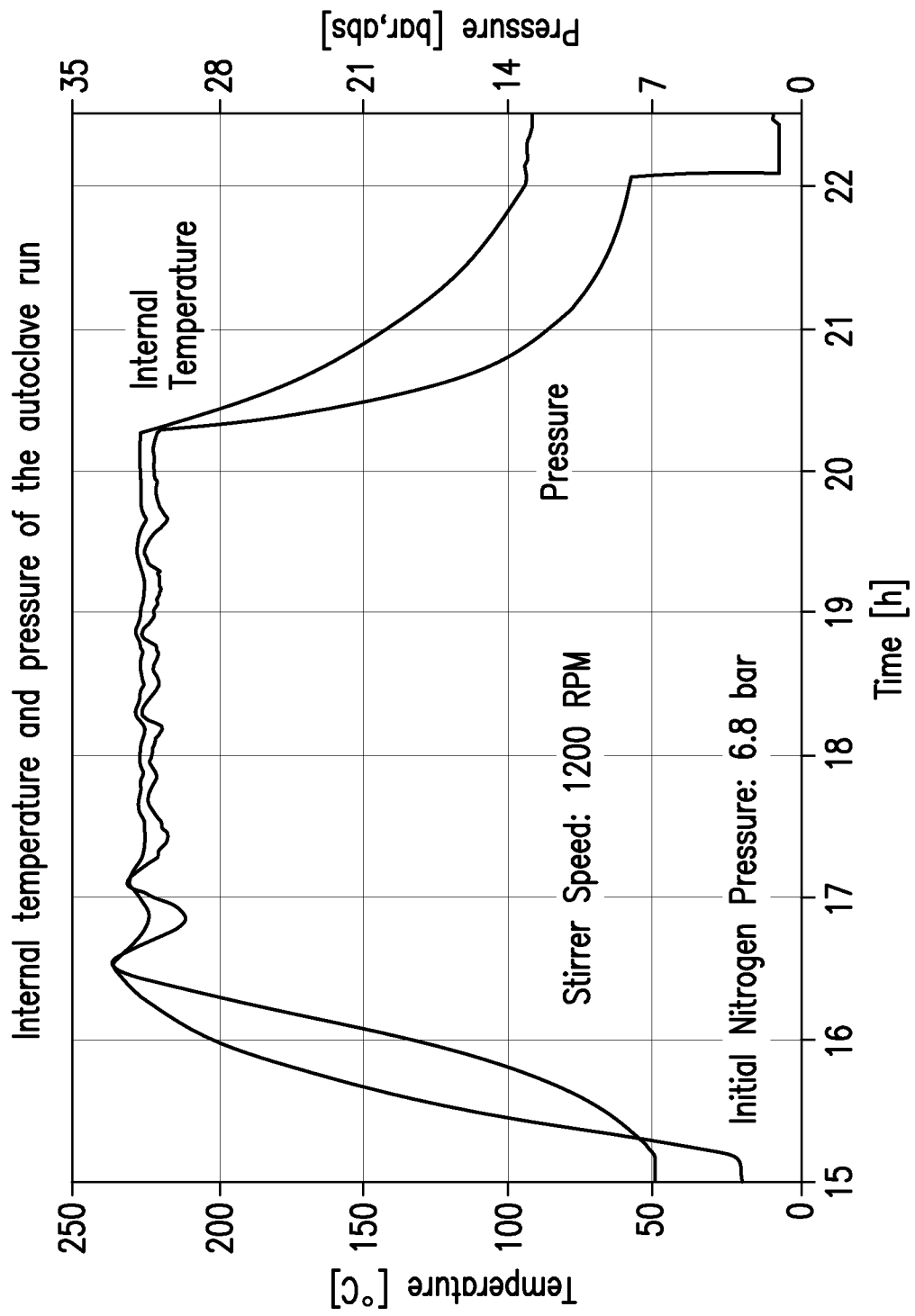
FIG. 4 illustrates the relationship between time, and shows internal temperature and pressure, of an autoclave run according to various embodiments.

According to various embodiments, the formation of sodium silicate broth can be carried out according to the following method. A solid silica sand can be reacted hydrothermally with caustic soda in an autoclave having a digestion condition that converts reactants to sodium silicate. The reaction solution does not necessarily contain any silicate initially. Conventional caustic can be suitable for this reaction. Generally, the washed sand and caustic soda can be mixed in stoichiometric quantities. A mixture thus prepared can be pressure digested in an autoclave at temperatures ranging from 180° C. to 300° C., for a period of from about 4 hours to about 16 hours, for example, at a temperature of from about 200° C. to 250° C., or 225° C., and for a time of from about 4 hours to about 4.5 hours. FIG. 4 depicts an internal temperature and pressure, against time, graph for an autoclave run according to various embodiments.

In some embodiments, the core of the experimental set-up can be an INCONEL 600® high pressure autoclave having a diameter (D) of 110 mm, a height (H) of 350 mm, and a total volume (V$_{total}$) of 3.3 liters (L). The autoclave can be equipped with a turbine stirrer having 6 blades and a diameter (D) of 55 mm.

In some embodiments, a reactor can be used that is equipped with electrical heating, temperature/pressure indicators, a temperature controller, a speed controller, and a nitrogen supply. A prepurified silica sand scrub can be first charged into the open reactor vessel. Then, the reactor can be reassembled and a sodium hydroxide solution and water can be charged into the reactor vessel at ambient temperature. The aqueous sodium hydroxide solution can comprise from about 15% by weight to about 30% by weight sodium hydroxide, for example, from about 25% by weight to about 30% by weight sodium hydroxide Next, the reactor can be pressure tested with nitrogen and left with a nitrogen pad of between 4 bars and 8 bars in order to avoid condensation on the unheated top of the autoclave during the run. After the pressure test, a stirrer and electrical heating can be switched on, thus heating the mixture inside the vessel under agitation. The reactor temperature can be set between 180° C. and 225° C. causing a pressure in the reactor of from about 24 bars to about 35 bars (including the initial nitrogen pad). When the temperature reaches a set value, the reaction can be held at a set temperature and for a set duration before the reactor contents are cooled down and depressurized to atmospheric pressure. Then, the resulting reaction broth can be siphoned out, with nitrogen pressure, through a dip tube and into an unheated vacuum filter unit where it can be filtered at about 95° C. to separate all the unreacted inert material from the solution.

In some embodiments, INCONEL 600®, titanium, and nickel can be used as exemplary materials for the construction of the autoclave, for example, the autoclave can comprise nickel or a nickel material.

In some embodiments, the silicate broth filtration operation can be performed by a heated pressure cartridge using appropriate filter cloth.

According to various embodiments of the present teachings, an exemplary autoclave digestion process can be carried out according to the following reaction conditions:
1. The speed of the stirrer can be in the range of from 700 rpm to 1200 rpm, for example, 700 rpm;
2. The reaction temperature can be in the range of from 180° C. to 250° C., for example, 225° C.; and
3. The reaction time can be in the range of from 4 hours to 4.5 hours, for example, 4 hours;

In some embodiments, this can accomplish a sodium silicate solution of the following results:
1. A yield of 91.2% to 96.4%;
2. A modulus of 2.1 to 2.8;
3. A SiO$_2$ content of 29.9% to 33.8% by weight; and
4. A Na$_2$O content of 11.3% to 14.2% by weight.

Precipitation of Amorphous Silica

According to various embodiments, and in a second aspect of the present teachings, amorphous silica can be prepared from a sodium silicate solution as a starting material for a precipitation reaction. In some embodiments, by-product hydrochloric acid can be used for the precipitation reaction. Precipitation of amorphous silica can require avoiding, during its preparation, any conditions of macroscopic gel formation. There can be a close relation between formation of silica gel and of precipitate. In precipitation, silica concentration can be lower and particles can be brought together into aggregates by forces of coagulation. In the absence of a coagulant, silica might not be precipitated from solution at any pH, because the particles might be mutually repulsive. Coagulation can result from reduction in the double-layer repulsion, for example, by decreasing the surface potential by changing pH, or by increasing the concentration of electrolyte. These facts can be used in a precipitation process for silica. When silica particles are present in a hot suspension at a pH of from 9 to 10, they can be coagulated when the concentration of sodium ion present exceeds about 0.3N.

In some embodiments, a sodium silicate solution to be used as a starting material in this second aspect of the present teachings can have a ratio of from about 2.1 to 2.8 SiO$_2$:Na$_2$O, and exhibit a sodium normality of about 0.13 C, where C is the silica concentration in grams per 100 mL.

In acidic solution, silicic acid can polymerize to extremely small particles that chain together to form a network of gel throughout the water. At low concentrations, this can collect into weak gelatinous masses, but otherwise fills the whole volume. In alkaline solution, silica can polymerize to discrete colloidal particles that grow in nanometer size range and remain as a stable sol. In some embodiments, precipitated silica particles can be prepared that comprise aggregates of ultimate particles of colloidal dimensions that have not at any point existed as macroscopic gel during the preparation.

According to various embodiments of the present teachings, precipitated silica particulates can be prepared in a cake that contains a low amount of water. The properties of the particulates make them readily adapted for use as a modulus-boosting silica source material for sodium silicate solutions. The low amount is compared to a conventional silica filter cake that generally contains a surprisingly high amount of water.

According to various embodiments, a process for the preparation of a precipitated silica according to the present teachings will now be described. A starting material for such process can comprise a sodium silicate solution of low modulus, such as, for example, a sodium silicate solution prepared as described above. Silica particulates produced in the manner described above can be particularly suitable for use as starting materials.

In some embodiments of the present teachings, a process is provided for the preparation of a precipitated silica from a sodium silicate solution wherein silica particles can be generated by neutralizing a silicate solution with an acid, and colloidal silica particles can be enabled to grow in weekly alkaline solution. The colloidal silica particles can be flocculated by sodium ions of a resulting sodium salt suitable for boosting the ratio of $SiO_2:Na_2O$. In some embodiments, the present teachings provide a process for the preparation of precipitated silica that advantageously will have better dissolution properties when used in a sodium silicate solution to boost the modulus of the sodium silicate solution. The precipitated silica of the present teachings can have a low structure. The term "structure" is defined as the ability of a silica material to hold water in the wet cake after the precipitate has been filtered. Accordingly, a structure grading of 65 or greater can be used. Herein, the ranges of >85 to 95, from 75 to 85, and from 65 to 75, are referred to as very high structure, high structure, and medium structure, respectively. According to various embodiments, the present teachings can provide low structure precipitated silica suitable, for example, for the purposes mentioned herein above.

According to various embodiments, the preparation of precipitated silica can comprise reacting sodium silicate solution of Step-2 having a composition in which the weight ratio of $SiO_2$ to $Na_2O$ is from about 2.1 to 2.8, with an acidifying agent, to produce a suspension of a precipitated silica. The suspension can then be separated. In some embodiments, the precipitation can comprise:

A. Forming an initial seed-containing silicate base stock prepared by an initial charge of a silicate solution, the concentration of silicate in the base stock being controlled by the pH of solution and without containing any electrolyte such as the salt of the seeding silicate and the acidifying agent, for example, without containing (or free of) any sodium chloride in the case of the reaction of sodium silicate with hydrochloric acid;

B. Simultaneously adding acidifying agent and sodium silicate solution to the reaction medium under a first reaction medium pH (pH1) of less than 9, then at a second reaction medium pH (pH2) of between 2 and 7, at a particular feed rate, while maintaining a reaction medium precipitation temperature of from 60° C. to 90° C.;

C. Digesting and maturing the reaction medium under the same temperature and pH conditions to allow all the $Na_2O$ added to be neutralized, and regulating the final pH of the silica to a desired value for a given application; and D. Separating the silica suspension by filtration followed by washing.

In some embodiments, the silicate can be the sodium silicate of Step-2 described above, having a molar ratio between 2.1 and 2.8.

The acidifying agent can comprise a strong mineral acid such as, for example, sulphuric acid, nitric acid, or hydrochloric acid, or an organic acid such as, for example, acetic acid, formic acid or carboxylic acid, or a combination thereof. In some embodiments the acidifying agent can comprise by-product hydrochloric acid produced from a titanium dioxide manufacturing method using the chloride process. The acidifying agent can be dilute or concentrated.

According to some embodiments of the present teachings, the reaction can be performed at a constant temperature. For example, the temperature of the reaction medium can be maintained at a temperature between 60° C. and 90° C., between 70° C. and 90° C., or between 80° C. and 85° C., for example.

According to various embodiments, precipitation can be carried out using the following steps:

E. Pre-filling a certain amount of water into a vessel as a reaction medium, and heating it up to a desired temperature, for example, to a temperature of from 60° C. to 90° C., of from 70° C. to 90° C., or of from 80° C. to 85° C.;

F. Adding an amount of sodium silicate solution to the pre-filled water until a pH of 8.5 is reached, thereby forming an initial silicate seed;

G. Simultaneously adding acidifying agent and a sodium silicate solution with a constant dosage rate for a period of from about 60 minutes to about 70 minutes, maintaining the pH at a level of from 8 to 10, for example, at 8.5. Adjustments can be made to correct for pH, for example, slight variations can be made as to the amount of acidifying agent that is added. The acidifying agent can be dilute or concentrated; for example, the concentration can be from about 10% by weight to about 50% by weight. The acidifying agent can comprise hydrochloric acid, for example, by-product hydrochloric acid resulting from the production of $TiO_2$ using the chloride process, and its concentration can, for example, be in the range of 10% by weight to 25% by weight, or in the range of from 20% by weight to 25% by weight;

H. The simultaneous addition can be continued for a period of from about 10 minutes to about 500 minutes, for example, from about 60 minutes to about 70 minutes. Addition can be stopped and the resulting slurry can be allowed to age for a period of one minutes to about 200 minutes, for example, from about five minutes to about 60 minutes, or from about 10 minutes to about 20 minutes;

I. Additional acidifying agent or acid can be added until the reaction medium reaches a pH of from 4 to 6.5, for example, a pH of from 4.5 to 5.5;

J. The slurry-containing precipitated silica suspension can be further digested and the reaction mixture can be matured, for example, for a period of time of from about one minute to about 100 minutes, from about one minute to about 30 minutes, or from about three minutes to about five minutes, to attain complete neutralization and to regulate a final pH of the silica to the desired value for an intended application;

K. The silica slurry produced after the operations described herein above can be further subjected to filtration, followed by washing. Filtration can be carried out using any convenient method known to one of ordinary skill in the art, for example by means of a belt filter, a rotary vacuum filter, a filter press, or a pressure filter, with residual water content less than about 50%. The filtration can be advantageously effected by a continuous vacuum belt filter.

In some embodiments, the suspension of precipitated silica thus recovered as filter cake can be used as such and a drying step in between precipitation and boosting might not be necessary for the overall process, in some embodiments of the present teachings.

In some embodiments of the process of preparation, the suspension can exhibit, immediately before filtration, a solids content in a range from 5% by weight to about 50% by weight, from 10% by weight to about 30% by weight, or about 30% by weight, to improve washability of the silica cake.

In some embodiments, the filter cake to be dried can have a water content of no greater than 55% by weight.

Boosting of Sodium Silicate Solution

Silicas prepared by using embodiments of a process of the present teachings can be utilised as precursors for the synthesis of high modulus sodium silicate as described hereinunder, for example in boosting the modulus of sodium silicate solutions from low modulus (in the range of from 2.1 to 2.8) to a modulus of high value (in the range of from 3.0 to 3.8).

According to various embodiments, a process for producing an intermediate sodium silicate solution with a $SiO_2$:$Na_2O$ molar ratio of less than about 3.0:1 can be directly combined with a subsequent reaction mixture comprising intermediate sodium silicate solution with added precipitated silica to produce a boosted sodium silicate solution having a $SiO_2$:$Na_2O$ molar ratio of from 3.0:1 to 3.8:1 as an end product.

An exemplary process for preparing boosted sodium silicate solution according to various embodiments, will now be further described. To an autoclave reaction product, after depressurizing the autoclave, a quantity of precipitated silica can be introduced. The quantity of sodium silicate added can correspond to the additional amount of $SiO_2$ required to establish a molar ratio of $SiO_2$:$Na_2O$ of from 3.0:1 to 3.8:1, in the sodium silicate solution desired as the end product. The reactor can then be left at a reaction temperature for about another 20 minutes to 60 minutes, with stirring. The soda water glass solution can then be further processed, for example, in a sedimentation vessel, for the coarse separation of solids, or, where clarity of the solution has to satisfy more stringent requirements, in a filter apparatus.

In some embodiments, the pressurized liquid phase of the sodium silicate solution can be transferred to a second optionally preheated reaction vessel, into which a calculated quantity of precipitated silica has been introduced, and the reaction can be completed therein, boosting the modulus of the sodium silicate solution obtained in the autoclave reaction step. On completion of the reaction, water can additionally be added directly into the reactor or into a separate dissolution vessel. In some embodiments, the dissolution can be carried out in the same pressure vessel at the required conditions of temperature and agitation, or in a separate vessel.

EXAMPLES

The following specific examples are provided to more particularly illustrate the present teachings and are not to be construed as limitations thereon.

Washing and Filtration of the Sand

Examples 1-3

These examples illustrate the initial preparation of SSS recovered from a titanium dioxide slurry, the resulting sand containing $TiO_2$ in an amount of up to about 9.1% by weight.

Deionized (DI) water was taken in a 7 liter volume beaker (diameter (D)=155 mm) with a central bottom outlet that was closed with a plug. The vessel was equipped with 4 baffles and a 6 blade Ruston-Turbine that was installed 20 mm above the bottom of the vessel. In order to achieve a homogenous suspension in the vessel, an additional 3-blade Pitched-Blade Turbine was installed. With the agitator switched on, SSS were charged into the vessel and agitated for 5 minutes at from 600 rpm to 800 rpm. The filling ratio of the vessel height/diameter (H/D) was in the order of 0.8 to 1.0. At the end of 5 minutes agitation and while the stirrer was running, the plug was removed so that the SSS suspension drained onto the filter immediately under the bottom outlet and was allowed to drain for about 20 seconds. The cake was washed four times with water. The wash water was added to the filter cake. The washed and filtered sand was dried in an oven at 105° C. and finally sieved through a one millimeter (mm) sieve. The fractions greater than one mm constituted about 2% of the total weight, and were rejected.

Three samples (1, 2 & 3) were prepared. The washing and filtration details for preparing samples 1, 2, and 3 are set forth in Table 4 and Table 5 below. Table 6 gives the analytical results of the dry sand.

TABLE 4

Experimental Details

| | Example 1 | Example 2 | Example 3 |
|---|---|---|---|
| Vol of vessel, L | 7 | 7 | 7 |
| Diameter of vessel, mm | 155 | 155 | 155 |
| Stirrer Type | Rushton Turbine | Rushton Turbine + 3-blade Pitched Blade Turbine | Rushton Turbine + 3-blade Pitched Blade Turbine |
| Baffles (4x) | Yes | yes | yes |
| Stirrer Diameter, mm | 70 | 70 + 100 | 70 + 100 |
| Speed, rpm | 800 | 710 | 600 |
| DI water, g | 3500 | 3500 | 3500 |
| Quartz Sand (wet), g | 3850 | 3850 | 3850 |
| Agitation Time, min | 5 | 5 | 5 |
| Estimated Specific Power Input (P/V), W/L | 6.6 | 14.4 | 8.7 |

TABLE 5

Washing and Filtration Data

| | Example 1 | Example 2 | Example 3 |
|---|---|---|---|
| Filter Area, cm$^2$ | 700 | 700 | 700 |
| Filter Cloth | 05-1005 K-115 | 05-1005 K-115 | 05-1005 K-115 |
| Water Wash 1, g | 2750 | 2750 | 2750 |
| Water Wash 2, g | 2750 | 2750 | 2750 |
| Water Wash 3, g | 2750 | 2750 | 2750 |
| Water wash 4, g | 3100 | 3100 | 3100 |
| Cake Height, mm | 31 | 31 | 30 |
| Sand (Moist), g | 3395 | 3386 | 3349 |
| Residual Moisture, % | 6 | 7 | 6 |
| Sand (Dry), g | 3186 | 3138 | 3132 |

TABLE 6

Analytical Results (Dry Sand Sample)

|  | Example 1 | Example 2 | Example 3 | Original Sand: Unwashed & sieved |
|---|---|---|---|---|
| Ti, % | 0.077 | 0.058 | 0.055 | 5.8 |
| Al, % | 0.10 | 0.10 | 0.10 | 0.13 |
| Ca, % | 0.15 | 0.15 | 0.17 | 0.17 |
| Fe, % | 0.05 | 0.05 | 0.035 | 0.025 |
| Cr, ppm | 15 | 20 | 10 | 3 |
| Mn, ppm | 5 | 5 | 5 | 5 |
| Ni, ppm | <5 | <5 | <5 | <2 |
| Pb, ppm | <5 | <5 | <5 | <2 |

The result shows that the silica sand scrubs can be washed substantially free of $TiO_2$.

Autoclave Reaction and Filtration of Residuals

Examples 4-6

Washed, dried and sieved sand was first charged into the open reactor vessel. Then the reactor was reassembled and the sodium hydroxide solution and water were charged into the reactor at ambient temperature. Next, the reactor was pressure tested with nitrogen and left with a nitrogen pad of between 4 bar-a and 8 bar-a in order to avoid condensation on the unheated top of the autoclave during the experimental run. After the pressure test, the stirrer and electrical heating were switched on, thus heating the mixer inside the vessel under agitation. When the temperature reached the set value, the reaction was held at the set temperature and duration before the reactor contents were cooled down and depressurized to atmospheric pressure and the resulting reaction broth was siphoned out. The reaction broth was siphoned with nitrogen pressure through a dip tube and into an unheated vacuum filter unit where it was filtered at about 95° C., separating all the unreacted inerts from the solution.

Tables 7 and 8 below provide summaries of autoclave operations, filtration details, and analytical data corresponding to Examples 4-6.

TABLE 7

Summary of Autoclave Reaction Runs

|  | Example 4 | Example 5 | Example 6 |
|---|---|---|---|
| Reactor Material of Construction | Inconel 600 | Inconel 600 | Titan |
| Internals | Cooling Coil | Cooling Coil | N/A |
| Target Temp., ° C. | 225 | 225 | 225 |
| Speed of Stirrer, rpm | 1200 | 1200 | 700 |
| Initial Nitrogen pressure, bar | 8.0 | 6.8 | 4.0 |
| Reaction Time at Target Temp, Hr | 4 | 4 | 4 |
| Sand | 905 g SA 407202 | 1050 g SE 408262 | 510 g MC 409231 100 g MA 409091 110 g MA 409061 |
| Sodium Hydroxide (50.4%), g | 1171 | 1054 | 723 |
| DI water at start of run, g | 1042 | 1045 | 717 |
| DI water added after reaction time, g | — | — | — |

TABLE 8

Summary of Filtration Data

|  | Example 4 | Example 5 | Example 6 |
|---|---|---|---|
| Filter Type | vacuum | vacuum | pressure |
| Unit Area, $cm^2$ | 200 | 200 | 616 |
| Filter Cloth | B 46 MU 100 | B 46 MU 100 | PP2450 |
| Temperature of Filter Jacket, ° C. | 20 (no jacket) | 70 | 90 |
| Filtration Time, min | >120 | 165 | 8 |
| Filtration Pressure, bar | 0.5 | 0.2 | 4 |
| Filtrate, g | 2810 | 3314 | 1830 |
| Yield after reaction, % | 94.5 | 91.2 | 96.4 |
| Yield after Filtration, % | 94.1 | 90.2 | 86.5 |
| $SiO_2$ content, % | 29.9 | 28.2 | 33.8 |
| Modulus | 2.1 | 2.5 | 2.8 |

The moduli of the sodium silicate solutions were in the range from 2.1 to 2.8.

Precipitation of Amorphous Silica

Example 7

1.2 L of water were introduced into an indirectly heated 4 L precipitation vessel and heated to 85° C. while being stirred. The pH was initially adjusted to 8.5 while maintaining this temperature by adding a little water glass solution (weight modulus 2.8:1=24.6% $SiO_2$ and 9.1% $Na_2O$; density 1.405 g/ml). Precipitation was then performed for 107 minutes by simultaneously adding 2100 g of sodium silicate at a rate of 19.6 g/min of water glass (composition as stated above) and a sufficient quantity of 23% hydrochloric acid to ensure that the pH was held constant at 8.5. The solution was allowed to age for 20 minutes. This suspension was then acidified to pH 5.5 with 23% hydrochloric acid and aged for 5 minutes. The silica obtained was separated from the suspension using a Larox pressure filter at 4 bar-g pressure, the filter cake was washed two times with water wherein each time 500 grams of water was used, until the washed filtrate contained less than 10 g/L chloride content. The weight of filter cake obtained was 1136 g. The silica content of the suspension was 26.8% by weight, calculated based on the weight of the wet silica after filtration to the total weight of the slurry. The wet silica filter cake contained 39.2% water when dried at 110° C. for 2 hours.

The purity of the precipitated silica was 99.5% $SiO_2$ when analyzed by x-ray fluorescence (XRF).

Example 8

670 g of water was introduced into an indirectly heated 2.5 L precipitation vessel and heated to 80° C. while being stirred. The pH was initially adjusted to 8.5 while maintaining this temperature by adding a little water glass solution (weight modulus 2.8:1=21.3% $SiO_2$ and 7.9% $Na_2O$). Precipitation was then performed for 71 minutes by simultaneously adding 1390 g sodium silicate at a rate of 19.6 g/min of water glass (composition as stated above) and a sufficient quantity of 20% hydrochloric acid to ensure that the pH was held constant at 8.5. The solution was allowed to age for 20 minutes. This suspension was then acidified to pH 5.5 with 20% hydrochloric acid, and aged for five minutes. The silica obtained was separated from the suspension using a pressure filter at one bar-g pressure, and the filter cake was washed 3 times with water, each time using 284 g water. The weight of the filter cake obtained was 597 g. The silica content of the suspension was 23% by weight, calculated based on the weight of the wet silica after filtration to the total weight of the slurry. The wet silica filter cake contained 49.2% water when dried at 110° C. for 2 hours. The purity of the precipitated silica was 98.7% $SiO_2$ when analyzed by XRF.

Boosting of the Sodium Silicate Solution

Examples 9-12

In this group of examples, the precipitated silica sand in Example 7 and Example 8 was used to boost the $SiO_2:Na_2O$ molar ratio of the aqueous sodium silicate solutions produced in Example 4, Example 5, and Example 6. The experiments were conducted with different batch sizes varying from 959 g to 2169 g of water glass. The amorphous silica used for the boosting experiments was not dried after the preceding precipitation/filtration steps. Therefore the moisture content of the amorphous silica was between 45% by weight and 56% by weight.

The dissolution temperature was varied between about 75° C. and 92° C. The dissolution time at the lowest temperature of about 75° C. was about 10 minutes, after reaching the temperature, and was almost the same with all batches. In some embodiments of the present teachings, the dissolution temperature can be from about 80° C. to about 92° C., for example, about 80° C. or about 85° C.

Final clarifying filtration was performed, directly after boosting, in a pressure filter thermostated at about 90° C. The filtration time was about 10 min. with all samples. A heated cartridge filter was used for final clarifying filtration.

The $SiO_2:Na_2O$ ratio obtained varied from 3.0 to 3.8. The preparation conditions, filtration data, and analytical details of the final sodium silicate solutions are summarized below in Table 9, Table 10, and Table 11.

TABLE 9

Experimental Details

| | Example 9 | Example 10 | Example 11 | Example 12 |
|---|---|---|---|---|
| Vol of Glass Vessel, L | 4 | 4 | 4 | 4 |
| Vessel Diameter, mm | 145 | 145 | 145 | 145 |
| Stirrer Type | Rushton Turbine | Rushton Turbine | Rushton Turbine | Rushton Turbine |
| Baffles | No | No | No | No |
| Position of Stirrer | eccentrical and tilted | eccentrical and tilted | eccentrical and tilted | eccentrical and tilted |
| Diameter of Stirrer, mm | 58 | 58 | 58 | 58 |
| Speed, rpm | 350-400 | 500 | 400 | 400 |
| Distance Stirrer to Bottom, mm | 25 | 25 | 25 | 25 |
| DI Water, g | 686.7 | 319.3 | 126 | 243.8 |
| Water Glass from Autoclave Reaction, g | 1350 | 2161 | 1277 | 959 |
| Nomenclature Water Glass | RB407211 | RB408311 | RC409211 | RC410041 |
| Amorphous Silica (wet), g | 230.5 | 382.6 | 112.2 | 220 |
| Nomenclature Amorphous Silica | FA409071 | FA409131 | FA409291 | FC410071 |
| Sodium Hydroxide Solution from Cristal, g | N/A | N/A | N/A | N/A |
| Dissolution Temp., ° C. | 92 | 92 | 75 | 92 |

TABLE 10

Filtration Data

| | Example 9 | Example 10 | Example 11 | Example 12 |
|---|---|---|---|---|
| Filter Type | pressure | pressure | pressure | pressure |
| Unit Area, $cm^2$ | 125 | 125 | 125 | 125 |
| Filter Cloth | G11U004 | G11U004 | G11U004 | G11U004 |
| Temperature of Filter Jacket, ° C. | 90 | 90 | 89-95 | 95 |
| Filtration Time, min | 8 | 13 | 65 | aborted after 150 |
| Filtration Pressure, bar | 1 | 1.5 | 2-3 | 3 |
| Amount of Filtrate, g | 2227 | 2822 | 1469 | 1016 |

TABLE 11

Analytical Data

| | Example 9 | Example 10 | Example 11 | Example 12 |
|---|---|---|---|---|
| $SiO_2$ content, % | 27.2 | 28.7 | 28.9 | 27.6 |
| Modulus, R | 3.0 | 3.8 | 3.3 | 3.4 |
| Ti, ppm | 195 | 100 | 240 | 1400 |
| Al, ppm | 265 | 240 | 370 | 370 |
| Ca, ppm | 23 | 30 | 10 | 20 |
| Fe, ppm | 98 | 100 | 140 | 60 |
| Cr, ppm | 40 | 40 | 8 | 5 |
| Mn, ppm | <5 | <5 | <5 | <5 |
| Ni, ppm | <5 | <5 | <5 | <5 |
| Pb, ppm | <5 | <5 | 5 | <5 |

The final modulus of the sodium silicate solutions obtained was in the range from 3.0 to 3.8.

Example 13

Preparation of Sodium Silicate R=3.52

A sodium silicate with R=2.56 was reacted with precipitated silica at 80° C., obtaining a product with a raised value of R=3.52. The components of the reaction mixture were:

| | |
|---|---|
| SS, R = 2.56 ($SiO_2$ = 30.27%; $Na_2O$ = 12.18%) | 245.7 g |
| Precipitated Silica ($SiO_2$ = 95%) | 29.2 g |
| Water | 75.1 g |
| Total | 350.0 g |

The filtered solution had the following composition (by weight):

| | |
|---|---|
| R | 3.52 |
| °Be | 40.55 |
| SiO2 | 29.17% |
| Na2O | 8.55% |

Example 14

Preparation of Sodium Silicate R=3.51

A sodium silicate solution with R=2.80 was reacted with precipitated silica at 80° C. obtaining a product with a raised value of R=3.51.

The components of the reaction were:

| | |
|---|---|
| SS, R = 2.8 (SiO$_2$ = 24.6%; Na$_2$O = 9.1%) | 1000 g |
| Precipitated Silica (SiO$_2$ = 95%) | 150 g |
| Water | 80 g |
| Total | 1230 g |

The filtered solution had the following composition:

| | |
|---|---|
| SS, R | 3.51 |
| SiO2 | 24.48% |
| Na2O | 7.19% |

While the present teachings have been described in terms of exemplary embodiments, it is to be understood that the changes and modifications can be made that fall within the scope of the present teachings.

The invention claimed is:

1. A sodium silicate solution produced by a method comprising the steps of:
   (i) manufacturing titanium dioxide, wherein the manufacturing comprises generating a waste product, the waste product comprising a precursor solid silica source;
   (ii) collecting the waste product;
   (iii) exfoliating and removing at least about 85% by weight titanium dioxide particles adhering to the surface of the precursor solid silica source of the collected waste product, to form cleaned silica;
   (iv) producing an intermediate sodium silicate solution by a hydrothermal fusion reaction of the cleaned silica with a caustic soda in an autoclave;
   (v) forming an amorphous silica source by transposing the SiO$_2$ content of the intermediate sodium silicate of step (iv) by a separate precipitation process; and
   (vi) dissolving the amorphous silica provided in step (v) in the intermediate sodium silicate solution of step (iv) and raising the SiO$_2$:Na$_2$O molar ratio to result in a high modulus sodium silicate solution,
   wherein the high modulus sodium silicate solution is characterized by a presence of Ti and the following properties:
   a physical form of a clear and colorless liquid;
   a density of from 1.35 kg/L to 1.45 kg/L;
   a minimum content of 27.2% by weight of SiO$_2$;
   a maximum content of 9.0% by weight of Na$_2$O; and
   a SiO$_2$:Na$_2$O molar ratio of from 3.0:1 to 3.8:1.

2. The sodium silicate solution of claim 1, wherein the SiO$_2$:Na$_2$O molar ratio is about 3.52:1.

3. The sodium silicate solution of claim 1, wherein the precursor solid silica source of the waste product collected in step (ii) comprises silica sand scrubs from a titanium dioxide manufacturing process using chloride.

4. The sodium silicate solution of claim 1, wherein the hydrothermal fusion reaction of step (iv) comprises reacting the precursor solid silica source of the waste product collected in step (ii) with a caustic soda in a closed autoclave pressure reactor, at a temperature range of from about 180° C. to about 300° C., and under a saturated steam.

5. The sodium silicate solution of claim 4, wherein the caustic soda comprises an aqueous sodium hydroxide solution, and the amounts of the precursor solid silica source and the aqueous sodium hydroxide solution are such that the molar ratio of SiO$_2$ in the precursor solid silica source to dissolved Na$_2$O in the aqueous sodium hydroxide solution is in a range of from about 2.0 to about 2.8, with respect to 1.

6. The sodium silicate solution of claim 4, wherein the aqueous sodium hydroxide solution comprises dissolved Na$_2$O in an amount stoichiometrically equivalent to a molar ratio of SiO$_2$:Na$_2$O in a range of from about 3.0 to about 3.8, with respect to 1, and the aqueous sodium hydroxide solution comprises from about 10% to about 50% by weight sodium hydroxide.

7. The sodium silicate solution of claim 1, wherein the intermediate sodium silicate solution is produced in step (iv) by a hydrothermal fusion reaction of an aqueous sodium hydroxide solution with the cleaned silica formed in step (iii) in an autoclave pressure vessel at a temperature in the range of from about 180° C. to about 300° C., and under a saturated steam.

8. The sodium silicate solution of claim 7, wherein the aqueous sodium hydroxide solution comprises from about 15% to about 30% by weight sodium hydroxide.

* * * * *